United States Patent
Medica et al.

(10) Patent No.: US 6,987,666 B2
(45) Date of Patent: Jan. 17, 2006

(54) FLAT PANEL MONITOR STAND

(75) Inventors: John K. Medica, Austin, TX (US); Orin M. Ozias, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 36 days.

(21) Appl. No.: 10/397,714

(22) Filed: Mar. 26, 2003

(65) Prior Publication Data

US 2004/0190236 A1 Sep. 30, 2004

(51) Int. Cl.
G06F 1/16 (2006.01)

(52) U.S. Cl. .................. 361/681; 681/683; 248/424; 248/917; D14/376; D14/451

(58) Field of Classification Search ........ D14/314–316, D14/336, 338–340, 371, 374–376, 434, 451; 348/917–923; 312/223.1, 223.2; 361/681–683; 248/349.1
See application file for complete search history.

(56) References Cited

U.S. PATENT DOCUMENTS

| | | | | |
|---|---|---|---|---|
| 4,577,187 A | * | 3/1986 | Barr et al. ................. 361/681 |
| D354,949 S | * | 1/1995 | Yao ............................ D14/337 |
| 5,436,792 A | * | 7/1995 | Leman et al. ................ 361/686 |
| 5,465,936 A | * | 11/1995 | Wang .......................... 248/371 |
| 5,805,415 A | | 9/1998 | Tran et al. |
| 5,859,762 A | * | 1/1999 | Clark et al. ................. 361/686 |
| 6,031,714 A | * | 2/2000 | Ma ............................ 361/681 |
| 6,050,535 A | | 4/2000 | Kang |
| 6,061,104 A | | 5/2000 | Evanicky et al. |
| 6,062,523 A | * | 5/2000 | Lu .......................... 248/349.1 |
| 6,113,050 A | * | 9/2000 | Rush ..................... 248/346.01 |
| 6,134,103 A | | 10/2000 | Ghanma |
| 6,268,997 B1 | | 7/2001 | Hong |
| 6,275,375 B1 | * | 8/2001 | Nam ......................... 361/682 |
| 6,326,955 B1 | | 12/2001 | Ditzik |
| 6,330,993 B1 | | 12/2001 | Cho |
| 6,366,452 B1 | | 4/2002 | Wang et al. |
| 6,411,288 B1 | | 6/2002 | Min |
| 6,767,253 B1 | * | 7/2004 | Werner et al. .............. 439/638 |
| 2002/0149906 A1 | * | 10/2002 | Ichimura .................... 361/681 |
| 2003/0189155 A1 | * | 10/2003 | Serbinski et al. ........... 248/371 |

* cited by examiner

*Primary Examiner*—Lynn Feild
*Assistant Examiner*—Anthony Q. Edwards
(74) *Attorney, Agent, or Firm*—Haynes and Boone, LLP

(57) ABSTRACT

A monitor stand includes a configurable base having a swivel device. A monitor support extends from the base and a flat panel monitor is pivotably mounted on the monitor support. The base is configurable to receive an advanced port replicator and a portable computer, or an ultra-small form factor computer.

13 Claims, 3 Drawing Sheets

FLAT PANEL MONITOR STAND

BACKGROUND

The disclosures herein relate generally to information handling systems and more particularly to a flat panel monitor stand used with a computer system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Desktop computers include a monitor which is usually supported by a desk surface or the desktop computer housing. Notebook computers are typically connected to an external monitor through a port replicator or docking station. Notebook computer connections of this nature typically provide physical support for a monitor through the integration of a stand that is supported by legs and a space is provided under the stand for a docking station and a notebook computer. Typically, the docking connector is positioned at the back of the notebook, i.e. a rear-dock.

One manufacturer currently provides an advanced port replicator (APR) and dock that uses a bottom docking arrangement, i.e. a bottom-dock, rather than docking at the back of the notebook.

In a bottom docking arrangement, the portion of the full dock and the APR that fits beneath the notebook must be of minimal height to keep the notebook as near to horizontal as possible and to make the system work well within the limited height beneath the monitor stand.

The bottom-dock notebook architecture creates challenging solutions when combined with external cathode ray tube (CRT) displays through the use of traditional monitor stand concepts. Utmost of these challenges is the "blind mating of the docking connectors of the APR and the notebook, especially with the bottom-dock architecture.

One approach to consider is the use of a flat panel monitor (FPM) to improve visibility. It should be noted that the price difference between FPM's relative to ORT's is predicted to narrow, thus making the FPM a feasible alternative to the ORT.

Therefore, what is needed is an FPM stand usable with either bottom-dock architecture or rear-dock architecture and notebook or desktop systems.

SUMMARY

One embodiment, accordingly, includes a monitor stand including a base, a swivel device mounted on the base, a system adapter plate, a monitor support extending from the base and a flat panel monitor pivotably mounted on the monitor support.

A principal advantage of this embodiment is that the FPM stand is configurable for either bottom or rear-dock architecture and for use with either notebook or desktop systems.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
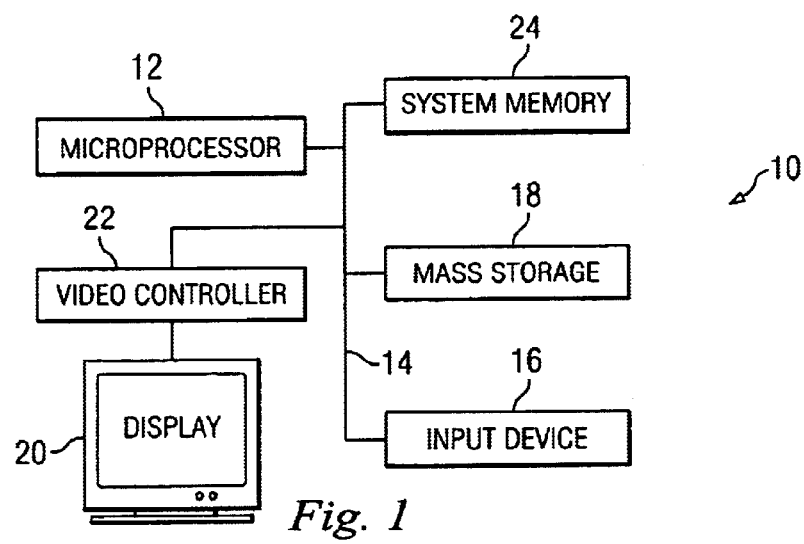
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
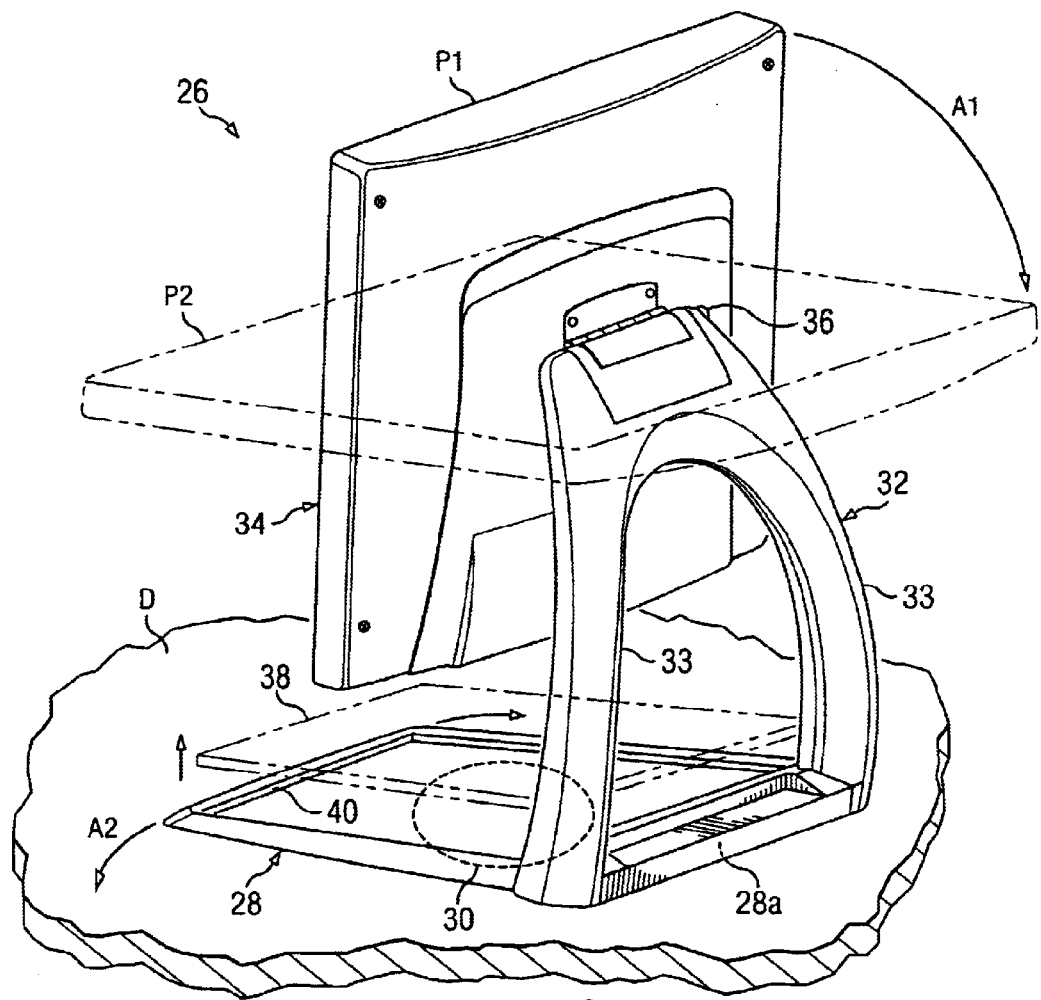
FIG. 2 is a perspective view illustrating an embodiment of a monitor stand.

In FIG. 2, a monitor stand is designated 26 and includes a base 28 which includes a swivel support 30 mounted on an under surface 28a of base 28. A monitor support 32 extends from base 28 and a flat panel monitor (FPM) 34 is pivotally mounted on the monitor support 32 at a pivotable connection 36. Monitor support 32 includes a pair of spaced apart arms 33. An attachment plate or system adaptor 38 is removably mounted on base 12. Plate 38 can be seated in seat 40 and removed from seat 40 as illustrated in phantom outline. The FPM 34 can be pivoted along an arc A1 between a first position P1 and a second position P2. Furthermore, due to the swivel support 30, monitor stand 26 can be pivoted along an arc A2. The swivel support 30, permits monitor stand 26 to swivel on any desk top or other support surface D. It would also be easy to create one adapter plate for the APR that is not removable and attach an adapter bracket to that plate to reduce costs.

Figure 3:
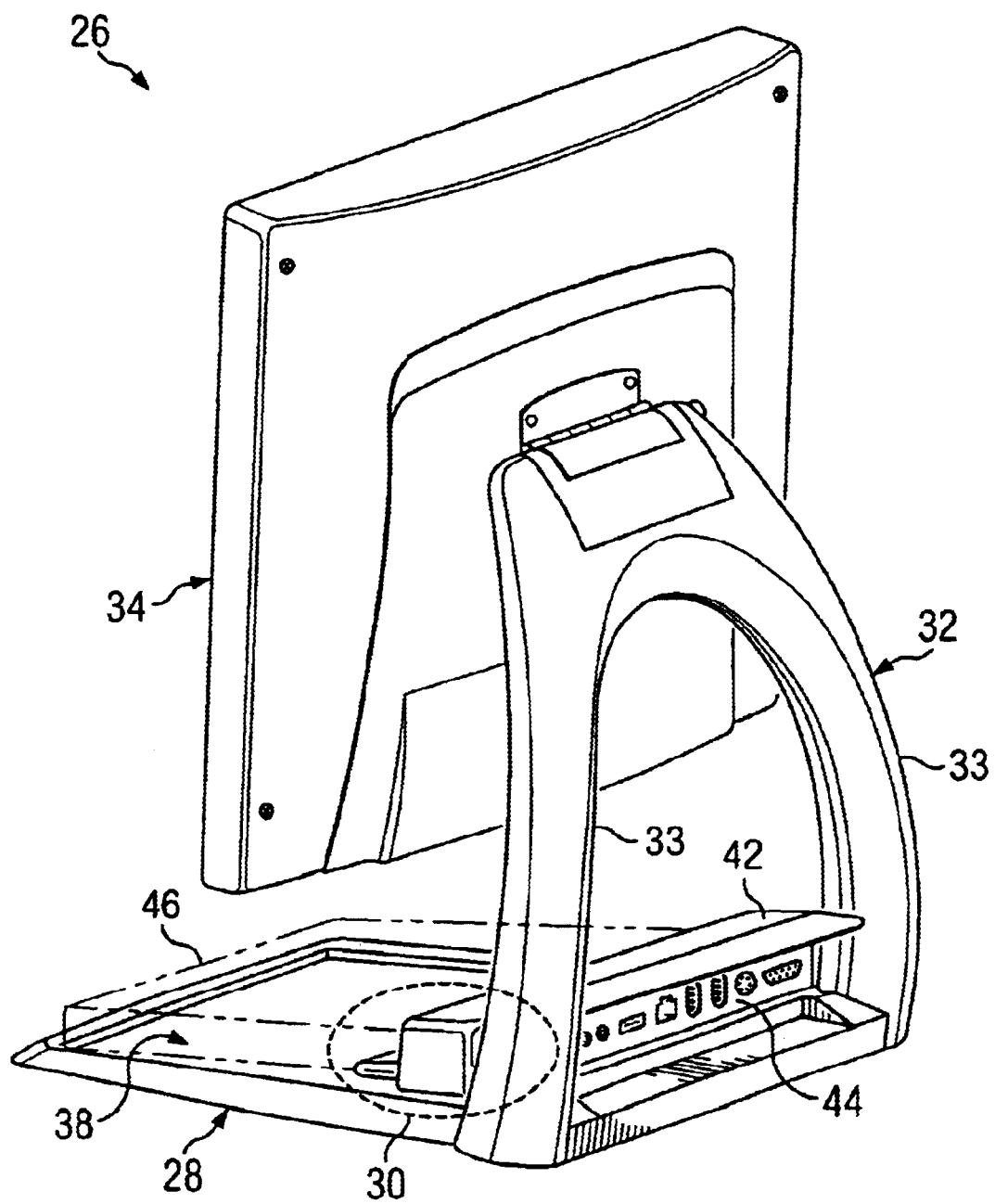
FIG. 3 is a perspective view illustrating another embodiment of the monitor stand.

In FIG. 3, the attachment plate 38 is seated on base 28 and includes an advanced port replicator (APR) 42. Due to the spaced apart arms 33, cable management is convenient at a connection surface 44 of APR 42. Also, base 28 is able to swivel on swivel support 30 as discussed above. Alignment and securing devices (not shown) may be provided on the attachment plate 38 for properly positioning the APR 24 and the portable computer 46.

Figure 4:
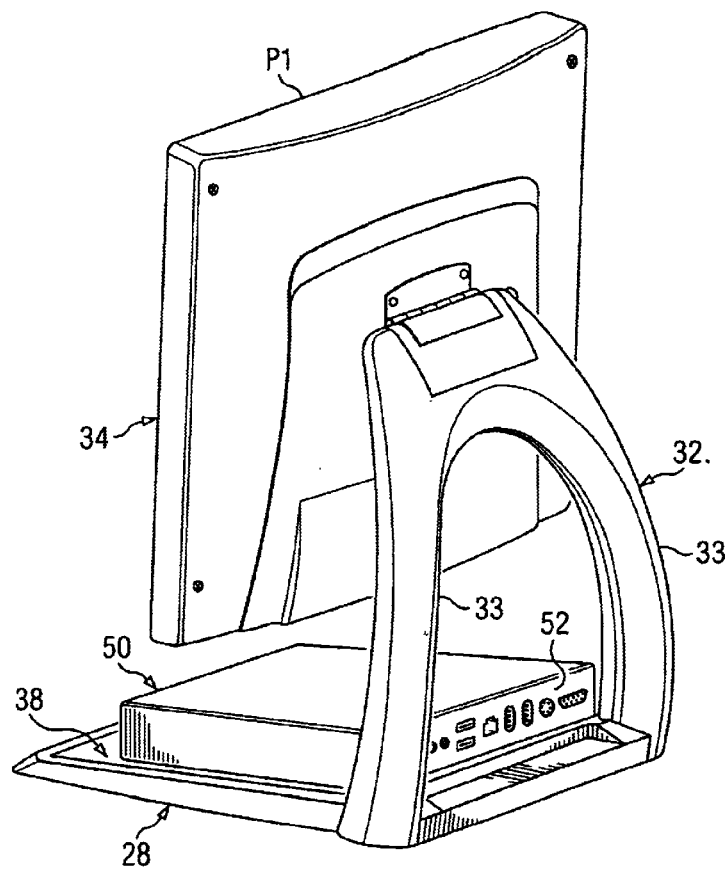
FIG. 4 is a perspective view illustrating a further embodiment of the monitor stand.
Figure 5:
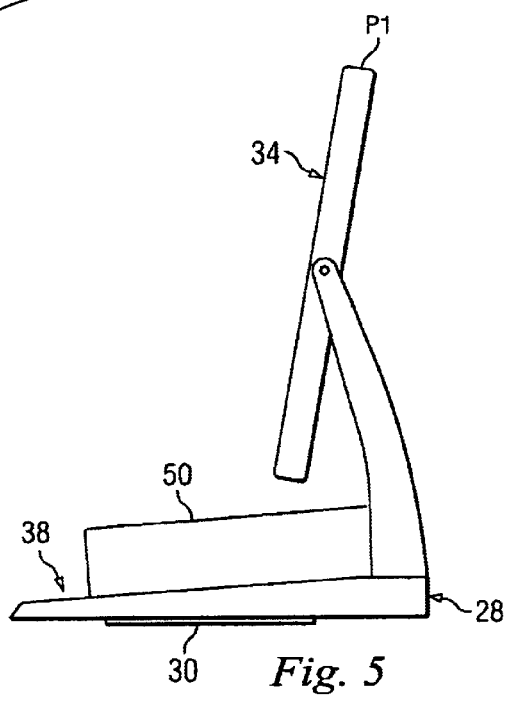
FIG. 5 is a diagrammatic side view illustrating an embodiment of the monitor stand.

In FIG. 4, the attachment plate 38 is seated on base 28 and includes an ultra-small-form-factor (USFF) computer 50. Due to the spaced apart arms 33, cable management is convenient at a connection surface 52 of USFF 50, which can be connected for use with FPM 34 in position P1. Also, base 28, FIG. 5, is able to swivel on swivel support 30 as discussed above. Alignment and securing devices (not shown) may be provided on the attachment plate 38 for properly positioning the USFF 50 on the attachment plate 38.

In operation, the monitor stand can support an attachment plate configured for supporting an APR and a portable computer, or the same or another attachment plate for supporting a USFF computer. The FPM can be used or can be pivoted to allow for the CRT of a portable computer to be used. The monitor stand optimizes desktop space and cable management.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A monitor stand for portable and desktop computers comprising:
   a base;
   a system adaptor plate mounted on a first side of the base;
   a swivel device mounted opposite the first side on a second side of the base;
   a monitor support extending from the first side of the base; and
   a flat panel monitor (FPM) pivotably mounted on the monitor support, wherein the system adaptor plate is removably mounted on the base for receiving one of an ultra-small form factor (USFF) desktop computer and an advanced port replicator (APR) for receiving a portable computer, whereby either of the USFF and the APR, along with the adaptor plate and the FPM, are supported to swivel with the base.

2. The monitor stand as defined in claim 1 wherein the swivel device extends from the base.

3. The monitor stand as defined in claim 1 wherein the monitor support includes a pair of spaced apart arms.

4. A monitor stand for portable and desktop computers comprising:
   a configurable base;
   one of a pair of removable computer housing supports mounted on a first side of the base;
   a swivel device mounted opposite the first side on a second side of the base;
   a monitor support extending from the base;
   a flat panel monitor (FPM) pivotably mounted on the monitor support, wherein a first of the pair of computer housing supports is configured to receive an advanced port replicator (APR) and a portable computer; and
   wherein a second of the pair of computer housing supports is configured to receive an ultra-small form factor (USFF) desktop computer, whereby either of the USFF and the APR, along with one of the housing supports and the FPM, are supported to swivel with the base.

5. The monitor stand as defined in claim 4 wherein the swivel device extends from the base.

6. The monitor stand as defined in claim 4 wherein the monitor support includes a pair of spaced apart arms.

7. An information handling system comprising:
   a chassis;
   a microprocessor mounted in the chassis;
   a storage coupled to the microprocessor; and
   a monitor stand for portable and desktop computers including a base for supporting the chassis and further including:
      a swivel support mounted on one side of the base, wherein the base is configured to receive either one of a first and a second interchangeable computer housing support on another side of the base opposite the one side, wherein the first computer housing support is configured to receive an advanced port replicator (APR) and a portable computer, and wherein the second computer housing support is configured to receive an ultra-small form factor (USFF) desktop computer;
      a monitor support extending from the base; and
      a flat panel monitor (FPM) pivotably mounted on the monitor support, whereby either of the USFF and the APR, along with one of the housing supports and the FPM, are supported to swivel with the base.

8. The system as defined in claim 7 wherein the first computer housing support is removably attached to the base.

9. The system as defined in claim 7 wherein the second computer housing support is removably attached to the base.

10. The system as defined in claim 7 wherein the swivel support extends from the base.

11. The system as defined in claim 7 wherein the monitor support includes a pair of spaced apart arms.

12. A method of mounting a portable and a desktop computer on a monitor stand comprising:
   providing a base;
   providing a plurality of removable computer housing supports for mounting on a first side of the base;
   mounting a swivel support opposite the first side on a second side of the base;
   extending a monitor support from the base;
   pivotably mounting a flat panel display on the monitor support; and
   mounting an ultra-small form factor (USFF) desktop computer chassis on one of the supports on the base, and interchangeably mounting an advanced port replicator (APR) and a portable computer on another of the supports on the base, whereby either of the USFF and the APR, along with one of the housing supports and the flat panel display, are supported to swivel with the base.

13. A computer system comprising:

one of a portable and a desktop computer chassis including a microprocessor and a storage coupled to the microprocessor;

a monitor stand including a base supporting the chassis;

a flat panel monitor (FPM) pivotably mounted on the monitor stand;

a swivel support device provided on one side of the base to movably support the monitor stand on an associated support surface;

a pair of arms extending between the monitor stand and the FPM, the arms being spaced apart for providing cable management access to the computer chassis; and a plurality of interchangeable and removable computer housing supports mounted on another side of the base opposite the one side, one of the supports receiving an advanced port replicator (APR) and a portable computer and another of the supports receiving an ultra-small form factor (USFF) desktop computer, whereby either of the USFF and the APR, along with one of the housing supports and the FPM, are supported to swivel with the base.

* * * * *

UNITED STATES PATENT AND TRADEMARK OFFICE
CERTIFICATE OF CORRECTION

PATENT NO. : 6,987,666 B2  Page 1 of 1
APPLICATION NO. : 10/397714
DATED : January 17, 2006
INVENTOR(S) : Medica et al.

It is certified that error appears in the above-identified patent and that said Letters Patent is hereby corrected as shown below:

Claim 1, Column 3, line 57, delete "fiat" and replace with --flat--.

Signed and Sealed this

Seventh Day of April, 2009

JOHN DOLL
*Acting Director of the United States Patent and Trademark Office*